United States Patent [19]

Finnemore

[11] 3,917,144

[45] Nov. 4, 1975

[54] ADAPTER APPARATUS FOR A FILM-HANDLING CASSETTE

[75] Inventor: Fred M. Finnemore, North Reading, Mass.

[73] Assignee: Polaroid Corporation, Cambridge, Mass.

[22] Filed: May 6, 1974

[21] Appl. No.: 467,075

[52] U.S. Cl. .................... 226/195; 188/69; 206/53; 352/78
[51] Int. Cl.² ........................................ B65H 23/08
[58] Field of Search ........... 226/195, 39, 48, 59, 60; 352/78; 206/DIG. 36, 53; 188/69

[56] References Cited
UNITED STATES PATENTS

| | | | |
|---|---|---|---|
| 3,239,058 | 3/1966 | Harnish | 206/53 |
| 3,780,634 | 12/1973 | Van Osch | 352/78 R X |
| 3,790,055 | 2/1974 | Sims | 226/195 X |
| 3,811,612 | 5/1974 | Hapke | 226/195 |

*Primary Examiner*—Richard A. Schacher
*Attorney, Agent, or Firm*—William A. Danchuk; Alfred E. Corrigan

[57] ABSTRACT

An adapter apparatus for a photographic film handling cassette which includes an exposure or projection station past which a strip of film is progressively advanced. The film strip is subsequently wound upon a film reel which is selectively driven for winding film thereupon. Mounted within the cassette between the exposure or projection station and the film reel is a snubbing roller which is freely rotatable upon its mounting and around which the film strip is adapted to pass. The adapter apparatus is releasably attached to the cassette and cooperates with the snubbing roller for arresting the free rotation of the snubbing roller. This locking of the snubbing roller provides a snubbing action to the film strip for isolating the inertial drag of the driven film reel from the exposure or projection station as the film strip is wound upon the film reel during both exposure and projection

32 Claims, 7 Drawing Figures

ADAPTER APPARATUS FOR A FILM-HANDLING CASSETTE

BACKGROUND OF THE INVENTION

1. Field of the Invention

This invention relates to photographic film cassettes and more particularly, to an adapter apparatus for a multipurpose film handling cassette.

2. Description of the Prior Art

The present invention is addressed to photographic film cassettes from which the film strip need not be removed during the exposure, processing and projection of the same. Exemplary of such systems are those described in prior U.S. Pat. No. 3,615,127 of Edwin H. Land issued Oct. 26,1971, and U.S. Pat. No. 3,641,896 of Rogers B. Downey issued Feb. 15, 1972, both of which are owned by the assignee of the present invention. The film-handling cassettes of the above-noted patents are adapted to be quickly mounted as a unit into a camera adapted to receive the cassette for exposure purposes and subsequently, into a viewing apparatus equipped to activate a cassette contained processor upon rewinding the exposed film strip. After processing in this manner, the viewing apparatus is operated as a projector to advance the film strip incrementally frame-by-frame past a light source so that the scene photographed is reproduced in a manner well known in the motion picture field. These systems not only greatly ease the job of projecting the film, but obviate the need to withdraw the film strip from the cassette during the various film operations accomplished within the camera or viewer apparatus.

In systems similar to those mentioned above, the film strip contained within the film-handling cassette is drawn onto a take-up reel or spool which is driven through a slip clutch arrangement. In this connection, the film strip is passed through a film gate, which acts as an exposure or projection station, and around a normally freely rotatable roller prior to being coiled upon the take-up reel. The roller is designed to freely rotate with film movement during the processing operation as well as all other rewind operations in both the camera and viewer apparatus. It is desirable, however, to stop the free rotation of the above-mentioned roller during both exposure operations within the camera and projection operations within the viewer apparatus in order to isolate the inertial drag of the take-up reel, and resulting film tension, from that section of the film strip which is disposed proximate the exposure or projection station. Absent such isolation, there would result slight movement of the film strip during the exposure or projection of the same thereby causing an undesirable blurring of the image.

Cameras and viewing apparatuses have been developed which provide for the automatic arresting of the roller during exposure and projection, while permiting the free rotation of the roller during all rewind operations. Exemplary of such systems are those shown in U.S. Pat. Nos. 3,584,942; 3,600,071; and 3,721,491 all by Rogers B. Downey, all of which are owned by the assignee of the present invention. While the roller rotation in all of the above-noted cameras and viewer apparatuses is automatically arrested, the arresting mechanisms reside in the cameras and viewers and not in the cassette per se. It would therefore be highly desirable to provide for the same roller operation described above regardless of whether the cassette is utilized in the noted cameras and viewer apparatuses or in cameras and viewer appartuses which do not incorporate automatic roller locking mechanisms.

SUMMARY OF THE INVENTION

In accordance with the present invention, an adapter apparatus for a multipurpose film-handling cassette is provided particularly for use within camera and viewer systems in which the particular film-handling cassette of the present invention is not specifically operationally provided for. The illustrated embodiments of this invention include features which are applicable for use in exposure operations, projection operations and combined operations wherein a film strip is retained within a multipurpose film-handling cassette during exposure, processing and projection. Importantly, the adapter apparatus of this invention includes a snubber roller locking device which may be manually actuated upon connection with the film-handling cassette or which may be selectively actuable to either lock or unlock the snubbing roller incorporated within the cassette.

In its illustrated embodiments, the invention is depicted in connection with a cassette which may be used during both exposure and projection operations. More specifically, the opposite ends of a strip of photographic film are respectively connected to coplanar spools of the cassette with a substantial portion of that photographic material initially coiled around one of the spools. The cassette also includes a film gate across which the film strip is transported as it is advanced from one spool to the other by film driving means provided within the camera and the viewer. Mounted behind the film strip in operable relationship to the cassette's film gate is a light-reflecting element through which film is illuminated during projection operations.

Disposed between the two film spools are a plurality of idler rollers, at least one of the idlers being positioned between each spool and the cassette's film gate. Specifically, one of the idler rollers located between the film gate and a spool which functions as a selectively driven take-up reel is formed as a snubber roller. The snubber roller is mounted for free rotation in either direction about its axis. An aperture is also provided within the housing of the cassette adjacent the end of the snubber roller for facilitating the selective introduction of the adapter apparatus into operable association with the snubber roller. In one of its preferred embodiments, the adapter apparatus is configured as a clip-on element having a force applying member attached thereto which engages the snubber roller for arresting the free rotation of th latter whereby a snubbing action is imparted to the film strip as it is advanced. Alternately, other embodiments of the adapter apparatus may be configured to also attach to the cassette in a releasable manner but which are selectively actuable to either lock or unlock the snubber roller upon their respective actuation.

The adapter apparatus encompassing the illustrated embodiments of this invention is configured for use with a multipurpose film-handling cassette of the type previously noted for providing a snubbing action to the film strip incorporated within the cassette. The snubbing action to the film strip is ideally provided when the film strip is being exposed or projectd for isolating an inertial drag of the driven take-up reel from the segment of film located proximate the film gate while it is being exposed or projected. During the processing operation, and for that matter all rewind operations, the snubber roller is freely rotatable as a consequence of either complete removal of the adapter apparatus, as exemplified in the clip-on embodiment, or selective actuation of the adapter apparatus for unlocking the snubber roller for free rotation, as exemplified in the other embodiments. Free rotation of the snubber roller, as well as all idlers, permits a more efficient rewind operation.

Accordingly, one of the objects and features of the present invention is to provide an adapter apparatus for a photographic film-handling cassette for arresting the free rotation of a film roller contained therein.

Another object and feature of the present invention is to provide an adapter apparatus for a photographic film-handling cassette, the adapter apparatus being selectively actuable to provide a snubbing action to the film strip through a film roller contained within the cassette.

Another object and feature of the present invention is to provide an adapter apparatus for a cassette of the type indicated which is selectively actuable to prevent a snubbing action to the film strip through a film roller contained within the cassette.

Yet another object and feature of the present invention is to provide an adapter apparatus for a cassette of the type indicated, the adapter apparatus being automatically actuable when interfaced between a roller contained within the cassette and a camera or viewer for providing a snubbing action to a film strip contained with the cassette.

Other objects and features of the present invention will in part be obvious and will in part become apparent from the detailed description to follow taken in conjunction with the accompanying drawings.

BRIEF DESCRIPTION OF THE DRAWINGS

The novel features that are considered characteristic of the invention are set forth with particularity in the appended claims. The invention itself, however, both as to its structure and its operation together with the additional objects and advantages thereof will best be understood from the following description of the preferred embodiment when read in connection with the accompanying drawings wherein:

DETAILED DESCRIPTION OF THE PREFERRED EMBODIMENT

Figure 1:
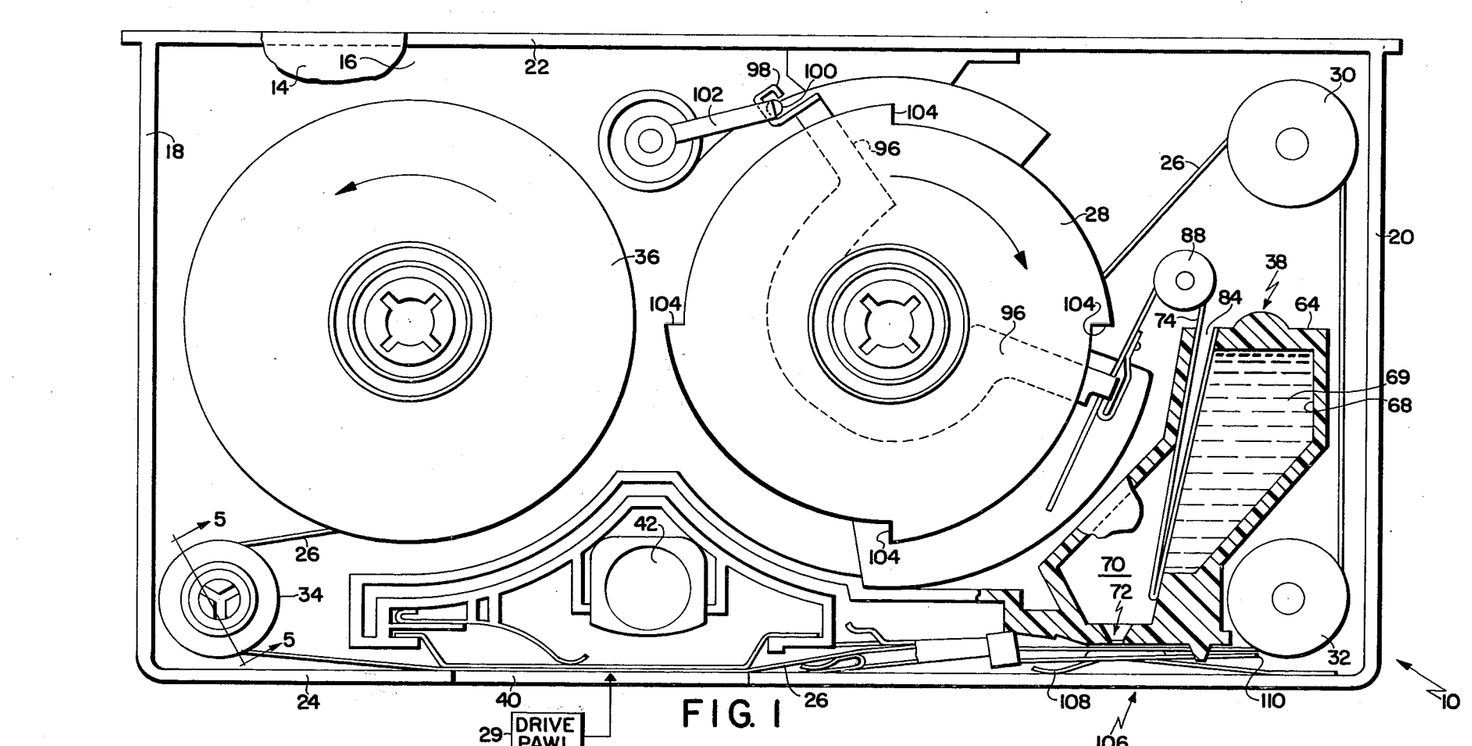
FIG. 1 is a plan view of a motion picture film handling cassette upon which the present invention is configured to be mounted.
Figure 2:
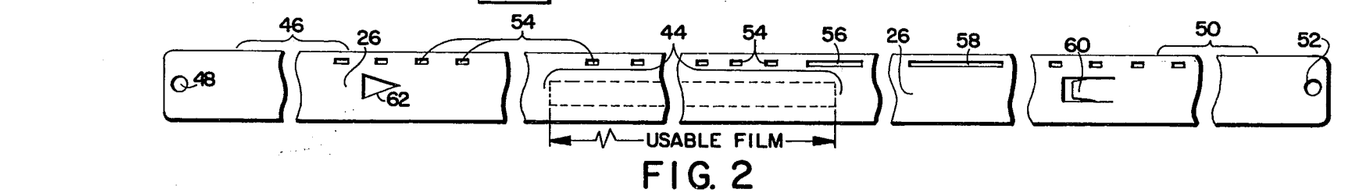
FIG. 2 is a fragmentary plan view of a film strip employed in the cassette shown in FIG. 1.

A preferred embodiment of this invention, which may be best understood by first referring to FIGS. 1 and 2 of the drawings, is designed for employment with a multipurpose film-handling cassette 10 of the type generally described in the above-mentioned United States Patents. The cassette 10 is configured for substantially automatic processing of a film strip responsive to appropriate transport of the latter. In this regard, the cassette of the illustrated embodiment includes an applicator system, explained in detail below, which is operable in accordance with a particular film transport program controlled by a special projector or viewer (not shown). It should be understood, however, that while the invention disclosed herein is particularly applicable to a cassette of the type described in the same above-noted U.S. Patents, it is not restricted to the same and may, of course, be applicable to any multipurpose film-handling cassette.

As shown in FIG. 1, the cassette 10 comprises a generally parallelpiped casing or housing constituted by planar faces or side walls 14 and 16, end walls 18 and 20, and elongated top and bottom edge walls 22 and 24. Carried within the housing is a photographic film strip 26 which is permanently attached at one of its ends, as later explained in regard to FIG. 2, to a rotatable supply spool or reel 28 from which it extends within the housing in an extended path around suitable rollers generally designated at 30, 32 and 34 to a take-up spool or reel 36 to which the opposite end of the film is attached. The take-up reel 36 is driven in the direction shown by a slip-clutch drive arrangement (not shown) which is operative to wind film upon reel 36 when a slack is present in the film strip 26. In its path within the housing, the film 26 extends across a normally inoperative film processing station 38, explained in detail below, and across an opening 40 which functions at different times to facilitate both exposure and projection. For facilitating the latter operation, a prism 42 is mounted behind the film strip 26 in an adjoining relation to both the opening 40 and to an illumination aperture (not shown) of the side wall 14. For a fuller understanding of the nature and operation of prism 42, reference should be made to U.S. Pat. No. 3,807,842 of Philip G. Baker.

In order to fully understand the operation of the cassette and the adapter apparatus of the present invention, it is advantageous to look at the strip 26 which is utilized therein and is illustrated in FIG. 2 as viewed from the outer side of the film as shown in FIG. 1. Preferably, the film strip 26 comprises a base of any suitable transparent material carrying, at least over a photographically useful length 44, an emulsion or photosensitive coating of any conventional variety as, for example, an emulsion capable of being developed by a monobath processing composition to form a positive transparency suitable for projection. A currently preferred embodiment of the invention makes use of a film structure, which, upon the base, comprises a photosensitive layer including both a photosensitive negative emulsion and an image-receiving layer to which a positive image may be transferred by diffusion during development without necessitating the subsequent removal of the emulsion containing its developed negative image. This highly desirable feature is made possible by a developed negative image having low covering power.

A composite film assembly of this type, as well as processing compositions for producing a fully developed black and white image without the necessity of removing the developed negative image after processing is shown in prior U.S. Pat. No. 2,861,885 to Edwin H. Land, which issued on Nov. 25, 1958 for "Photographic Processes and Products". Other composite film assemblies capable of producing developed full color images without the necessity of removing the developed emulsion are shown in prior U.S. Pats. of Edwin H. Land, No. 2,726,154, issued Dec. 6, 1955 for "Photographic Product", and No. 2,944,894, issued July 12, 1960 for "Photographic Process Utilizing Screen Members".

As shown in FIG. 2, the strip 26 includes a leader 46 terminating at an end formed with an aperture 48 which serves to connect that end of the film to the take-up spool 36. Behind the leader 46 is the strip 44 of photographically useful film upon which projectable images may be formed. Following portion 44 is a trailer region, generally designated at 50, which includes an aperture 52 by which end 50 of the film is connected to the supply spool 28. Located along one edge of the film strip 26 are a plurality of sprocket holes 54 which are configured for cooperation with a drive pawl represented by element 29 in FIG. 1. Drive pawl 29 is, in a preferred embodiment, present in some forth in both the camera (not shown) and the projector or viewer (not shown) for incremental advancement of the film strip 26.

Adjacent the trailing end 50, the series of sprocket holes 54 are interrupted by a first elongated sprocket hole 56 which may, for example, span two of the sprocket holes 54. Further, along the film in the direction of the supply reel end, the series of sprocket holes 54 is again interrupted by a second elongated hole 58, longer than the sprocket hole 56, and for example, spanning three of the sprocket holes 54.

As described in several of the aforementioned United States Patents, the first elongated sprocket hole 56 terminates the advance of the film in the camera and thereby establishes an exposure end point, whereas the second sprocket hole 58 determines a film take-up or projection end point in the projector apparatus. These different termination points are employed since it is preferred to advance the film beyond the exposure end point before applying processing composition to the exposed film, and for that purpose, a double film drive pawl (not shown) such that the film may be carried beyond the first elongated hole 56 until the second elongated hole 58 is encountered. This further advancement of the film in the projector unit is accomplished in order to bring a detent engaging element or projecting bump 60 into cooperative engagement with a pressure pad element of the processing station 38 as will be subsequently described. Additionally, the leader end 46 of the film strip 26 carries another detent engaging element, here shown as an aperture 62, which serves to actuate a valve member also forming a part of the processing station 38.

Referring again to FIG. 1, the film processing station 38 generally comprises a housing 64 which includes a reservoir 68 of processing fluid 69 mounted over an internal chamber 70 which communicates with a coating nozzle generally designated at 72. The fluid 69 which may, for example, be an aqueous alkaline solution such as in described in U.S. Pat. No. 2,861,885, is initially retained within the receptacle 68 by means of a peel-tab 74. The peel-tab 74 is in covering relationship with an opening (not shown) provided within one wall portion of reservoir 68. When peeled, tab 74 permits the exit of the processing fluid 69 into compartment 70 and into nozzle 72 through which it is applied to film strip 26.

Peel-tab 74 extends from its covering relationship with reservoir 68 through an aperture 84 formed in housing 64. The other end of peel-tab 74 extends around a roller 88 and is attached to an actuating assembly generally designated at 96. Actuating assembly 96 extends beneath the supply spool 28 to a hook-like end member 98 which is releasably latched to an upright post 100 and in engagement with a cam member 102. Upon insertion of the cassette 10 into the projector (not shown), the cam 102 is appropriately displaced by an applied signal or operation of a cassette-latching shaft (not shown) of the projector to drive the hook 98 from the post 100 and into engagement with one of four teeth 104 of the supply spool 28 under the urging of a spring (not shown). Then upon subsequent rotation of the spool in the rewind direction shown by the arrow in FIG. 1, the actuating assembly 96 is similarly rotated to cause the peel-tab 74 to peel away from covering relationship with the opening (not shown) of the receptacle 68 thereby releasing the fluid 69 to the nozzle 72.

Located beneath the exterior surface of the nozzle 72 is a pressure pad assembly 106, which is shown in FIG. 1 in the initial position assumed upon assembly of the cassette and prior to processing. As shown, the film strip 26 normally passes between the exterior of the nozzle surface and the pad assembly 106. The latter is mounted on and biased towards the nozzle surface by a leaf spring 108, and one end 110 of the pad 106 is configured to engage the base of the film 26 so as to cooperate with the protuberance 60 of the trailing end thereof.

Figure 5:
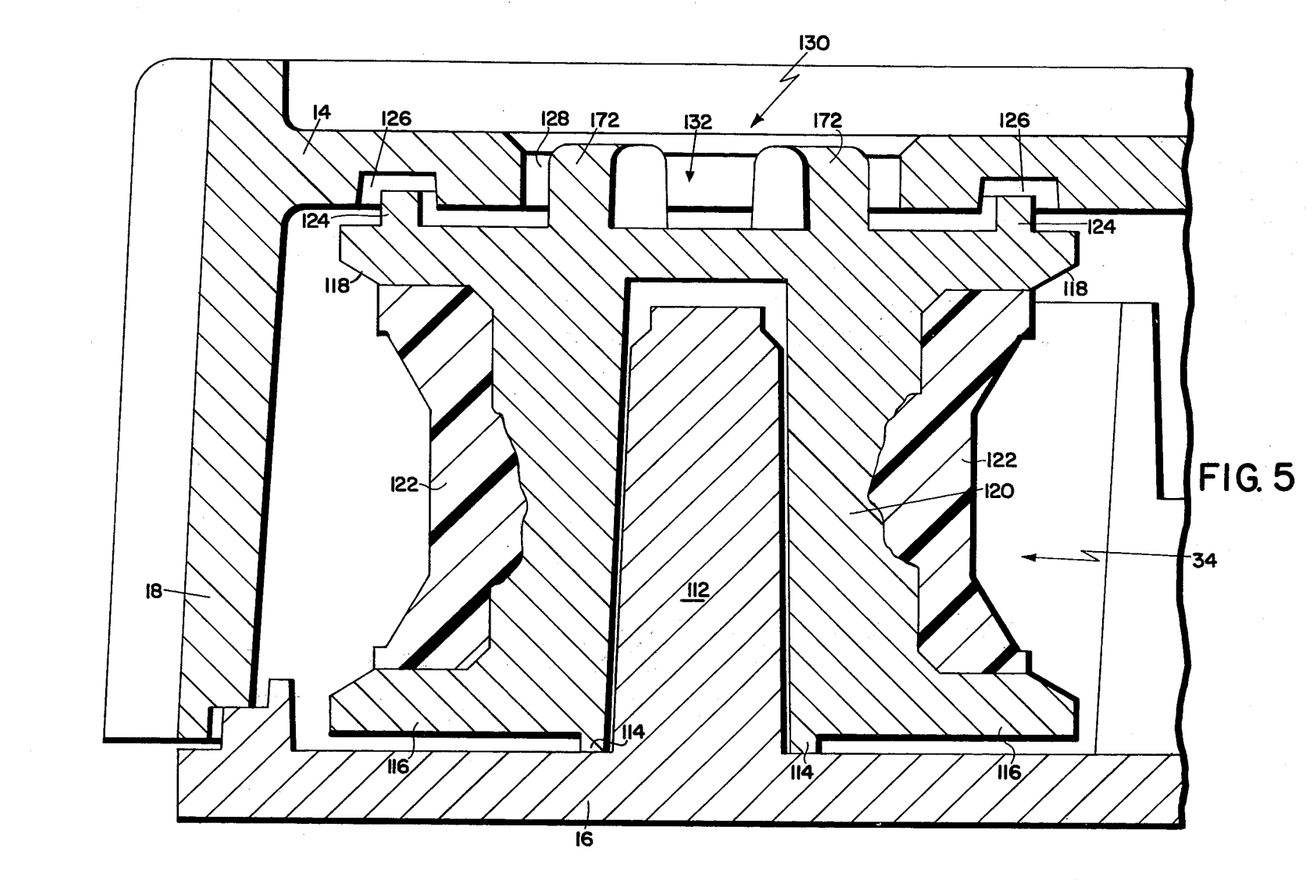
FIG. 5 is a sectional view taken through the line 5—5 as shown in FIG. 1.

As previously noted, roller 34 is positioned intermediate opening 40 and take-up reel 36 and is freely rotatably mounted within cassette 10 for bidirectional movement about its axis. A detailed view of roller 34 may be seen by referring to FIG. 5. Roller 34 is mounted for rotation about a spindle 112 formed as an integral portion of side wall 16. Roller 34 is supported for bidirectional rotation about its axis by a flanged extension 114 formed on a bottom portion 116 of the roller. A top portion 118 is separated from bottom portion 116 by a hollowed spacer section 120 of a suitable size for accommodating a section of the film strip 26. Disposed about the periphery of spacer section 120 is a generally toroidal-shaped rubber-like insert 122, the purpose of which will become apparent as the present description proceeds.

Figure 3:
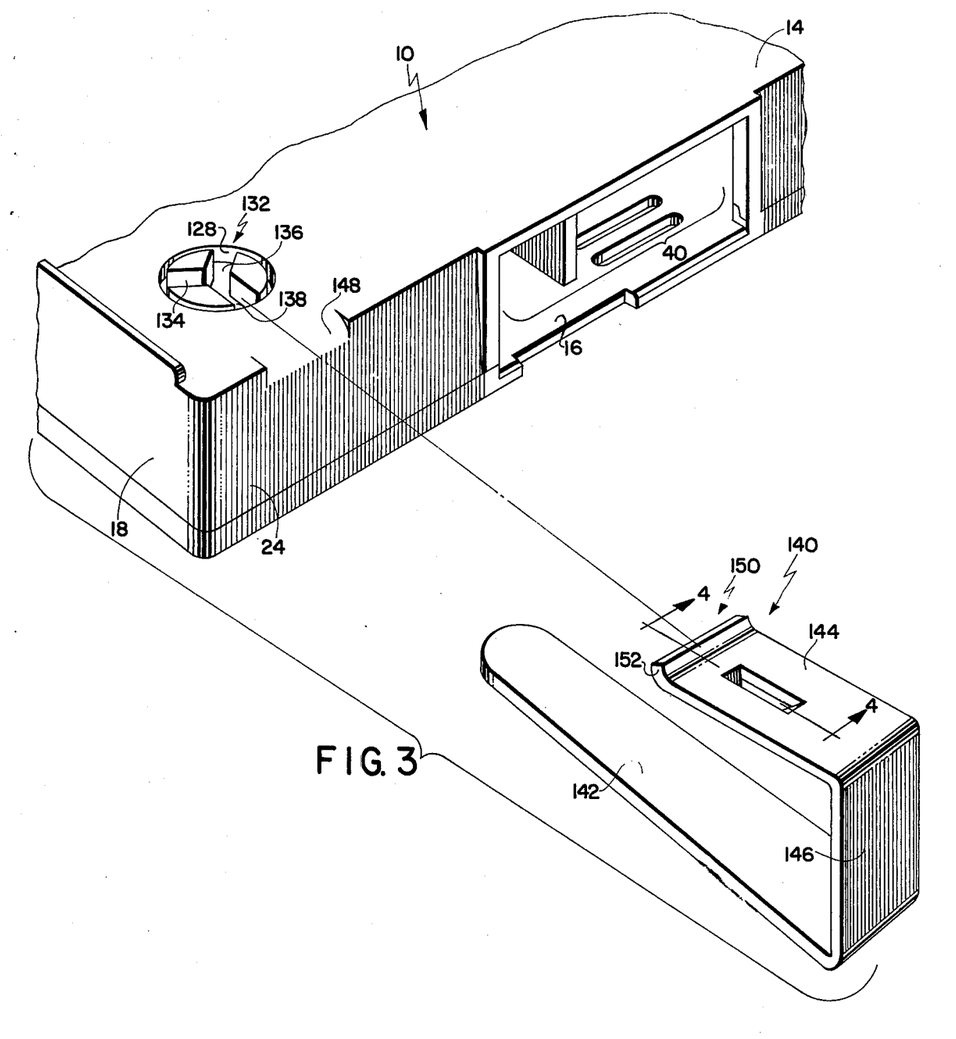
FIG. 3 is a perspective view of the adapter apparatus according to the present invention and a partial fragmentary perspective view of the cassette shown in lFIG. 1.

Top portion 118 of roller 34 is configured having a circular vertical flange 124 which, in cooperation with a circular shaped cut-out 126 on the interior of side wall 14, serves as a light seal for preventing the entrance of ambient light which may enter the cassette through an aperture 128 formed in side wall 14. Aperture 128 is circular in nature and has a center which is substantially co-linear with the axis of rotation of roller 34. Top portion 118 of roller 34 is further configured having an extension generally denoted at 130. Extension 130 includes a slotted arrangement 132 for aiding in the stopping of rotation of roller 34 as will be explained in further detail below. In a preferred embodiment of the present invention, slotted arrangement 132 is configured as a triple-spoked cut-away with radially extending elements 134, 136 and 138 as best seen in FIGS. 1 and 3. While the triple-spoked or "Y" configuration of the slotted arrangement is best suited in this present situation, it should become apparent that any suitably configured slot arrangement would satisfy the specific function which it is meant to perform.

Figure 4:
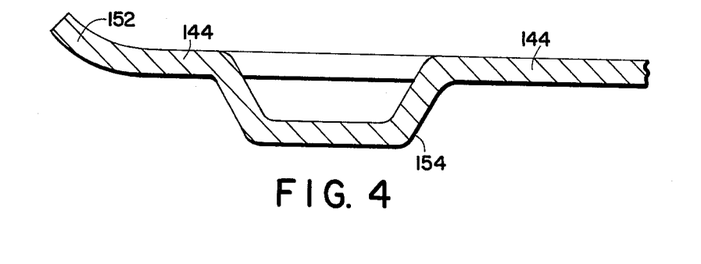
FIG. 4 is a sectional view taken through the line 4—4 as shown in FIG. 3.

Looking to FIG. 3, there is shown an exploded perspective view of the cassette 10 and one embodiment of the adapter apparatus according to the present invention. An adapter 140 is shown which is configured to be releasably attached to the exterior of cassette 10 and to engage a portion of roller 34 through the aperture 128 formed in the side wall 14. The adapter 140 is configured having a generally hook shape formed by an elongated bottom portion 142, a shortened top portion 144 and a connecting portion 146 positioned between the two. Connecting portion 146 spaces the top and bottom portions 144 and 142, respectively, a given distance from each other such that the adapter 140 may be conveniently clipped to the cassette 10. The adapter 140 is clipped to the cassette by placing bottom portion 142 along the exterior of side wall 16 such that top portion 144 engages a slightly rounded portion 148 of the corner between side wall 14 and bottom wall 24. A leading edge 150 of top portion 144 includes a rounded or up-turned segment 152 which aids in the proper location and connection of adapter 140 with respect to cassette 10. The adapter 140 is then pushed further in the direction of aperture 128 until a detent or force applying element 154 formed on the inside of top portion 144 falls into aperture 128 and engages one of the slot elements 134, 136 or 138. The force applying element 154 of the adapter 140 is preferably formed by punching through a portion of the top portion 144 to form the same as seen in FIG. 4. While this is a preferred method of producing the force applying member, it should be apparent that other methods and configurations may be employed to serve the same function without departing from the scope of the invention. Alternately, it should also be apparent that the exact configuration of the force applying member may confirm exactly to the configuration of the "Y" shaped spokes of roller 34 as will be seen in subsequent embodiments.

When properly attached to cassette 10, and the force applying element 154 is in proper engagement with one of the radially extending spokes, the adapter 140 is operative to arrest rotation of the roller 34 about its axis in either direction. The roller 34 is precluded from rotating whenever the adapter 140 is properly attached to cassette 10. Moreover, the adapter 140 and the rounded portion 148 on cassette 10 are so configured when connected that the connecting portion 146 of adapter 140 is up against the bottom wall 24 and the corner of adapter 140 between portions 144 and 146 fits within the rounded portion 148. This engagement at the rounded portion 148 provides, in combination with the frictional engagement between cassette 10 and adapter 140, a static coupling between the force applying member 154 and the slotted arrangement 132 for arresting the rotation of roller 34 for film snubbing purposes which will be discussed below and which demand the absence of relative movement between roller 34 and adapter 140.

Figure 6:
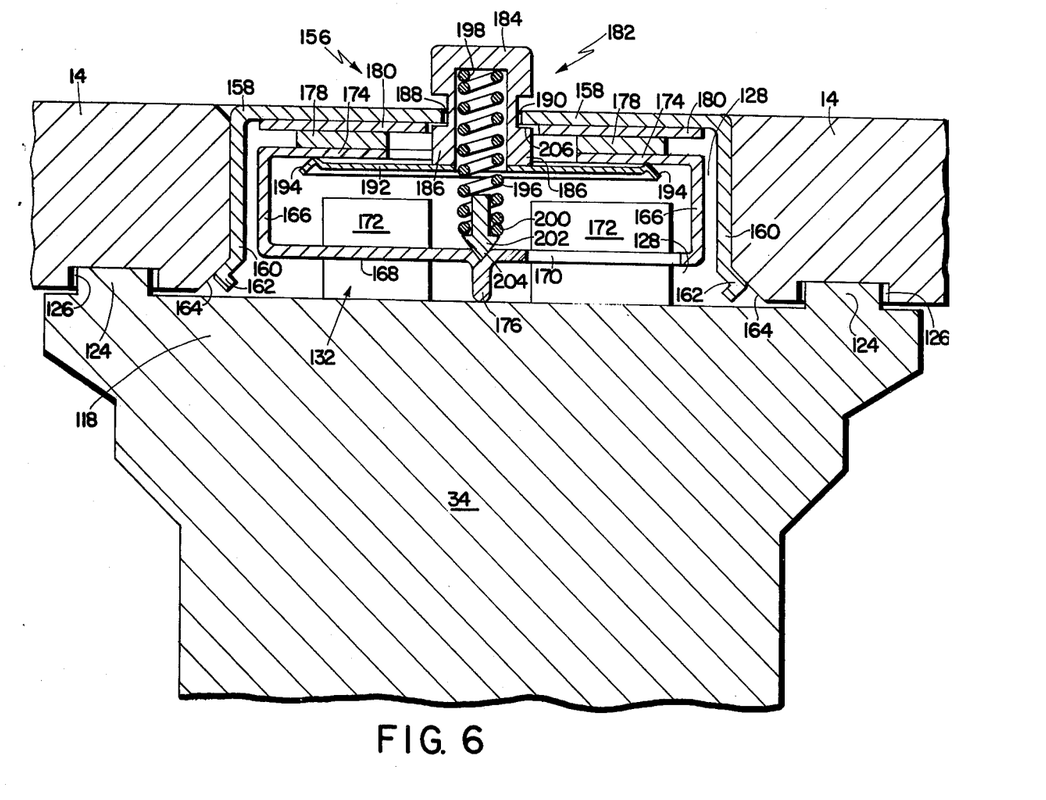
FIG. 6 is a partial sectional view of a second embodiment according to the present invention.

A second embodiment of the invention is shown in FIG. 6. An adapter 156 is provided for alternately locking and unlocking roller 34 upon selective actuation of the adapter in response to forces exterior of the adapter and cassette. As seen in FIG. 6, the adapter 156 is secured substantially totally within the confines of aperture 128 by a support member 158. Support member 158 is generally cylindrically shaped and is formed of a resilient material having a memory for providing an outwardly directed force at the ends 160 of the support member 158 for frictionally retaining and securing the adapter 156 on the cassette 10. Detents 162 are provided about the periphery of support member 158 which cooperate with a small angular cut-away segment 164 provided about aperture 128 as shown, for providing further securing forces between adapter 156 and side wall 14. While only one method of attachment is shown, it should become obsious that alternate methods, such as screwing adapter 156 into aperture 128, may be employed for releasably securing the adapter to the cassette.

The adapter 156 includes a force applying portion 166 which is configured having a circular shape and three spokes, one of which is shown as at 168. Portion 166 is complementarily configured with respect to the slotted arrangement 132 of roller 34 and is adapted to fit over the extensions 172 of slotted extension 132 of roller 34. In this regard, the force applying portion 166 includes a cut-away portion, as at 170, for accommodating the extensions 172 of roller 34. It should become apparent that three of such cut-aways are necessary given the configuration of the top of roller 34 for permitting portion 166 to fit over roller 34. The force applying portion 166 additionally includes a top horizontal portion 174 and a lower pointed end 176 located at the center of the force applying portion. End 176 engages the top of roller 34 and remains in this engagement throughout most operations of the adapter 156. Attached to the top horizontal portion 174 of portion 166 is a flattened toroidal shaped friction pad 178. The friction pad 178 is selectively movable into and out of frictional engagement with a second toroidal shaped friction pad 180 attached to the underside of the support member 158 of adapter 156. Both pads 178 and 180 may be formed of any suitable materials such that a high coefficient of friction exits between the two when they are in frictional engagement with each other.

Positioned in the center of support member 158 is an adapter actuator member or button 182 which is configured in a generally hollowed "I" shape. Actuator member 182 includes an upper portion 184, which extends above support member 158 and the upper limit of side wall 14, a lower portion 186, and a central portion 188 which extends through an aperture 190 formed in support member 158. Central portion 188 serves to connect upper portion 184 to lower portion 186 and permits an up-down movement of actuator member 182 through the aperture 190 formed in support member 158. The lower portion 186 has attached thereto a flat washer-like member 192 having a peripheral raised detent 194 formed at its outer edge as seen in FIG. 6.

Located through the center of adapter 156 coaxially configured relative to the axis of rotation of roller 34 is a compression spring 196. An upper end 198 of the spring 196 is attached to the upper portion 184 of actuator member 182, while a lower end 200 has attached thereto an arrow-like member or pivot 202. Pivot 202 is seated in a V-groove 204 formed in the center of lower pointed portion 176 of support member 158, the latter being configured to be rotatable about its axis on end portion 176.

The adapter 156 is configured to arrest the rotation of the roller 34 when attached to the cassette 10 in much the same manner as that described with respect to the first embodiment adapter 140 of FIG. 3. The similarity between the two adapters ends, however, when the actuation of the adapter 156 is considered. Specifically, the adapter 156 is actuable to lock and unlock the roller 34 for rotation in response to an externally applied force to the actuator member 182. As previously noted, adatper 156 functions to automatically arrest the rotation of roller 34 when the adapter is attached to the cassette. With no external force being applied to actuator member 182, the latter is in a position in which lower portion 186 is in contact with the interior of support 158. The lower portion 186 has a larger diameter than aperture 190 whereby contact is made between a segment 206 with support member 158. The upward biasing of member 182 by spring 196 provides a similar biasing to both washer-like member 192 and detents, 194, the latter being operative to move force applying member 166 upwardly such that frictional contact is made between the frictional pad 178, attached thereto, and the frictional pad 180 which is attached to support member 158. The upward movement of force applying member 166 is relatively slight so that force applying member 166 remains in its fitted condition with slotted extension 130 and extensions 172. As a result, the frictional engagement between friction pads 178 and 180 prevents relative motion of one with respect to the other and in particular, relative movement between force applying member 166 and support member 158 such that the former is locked and may not rotate relative to the latter. The locking of member 166 is translated through extensions 172 to roller 34, thereby locking the roller and preventing its rotation in any direction on spindle 112.

The unlocking of roller 34 for rotation about its axis in either direction is dependent upon an externally directed force being applied to actuator member 182 so as to force the latter in a downward direction against the upward biasing of compression spring 196. This externally directed force may be derived from either or both the camera and projector which form a portion of the photographic system and which will be described in detail below. Movement of actuator member 182 downward also moves washer-like member 192 and its detents 194 downwardly, resulting in a relaxation of the upward force on force applying member 166 and its friction pad 178. This relaxation results in a downward movement of force applying member 166 and friction pad 178 such that the latter is moved out of frictional engagement with pad 180. The lack of frictional engagement between pads 178 and 180 releases the constraint upon the force applying member 166 such that it may now rotate with the slotted arrangement 132 and roller 34, thus permitting the free rotation of roller 34 about its axis. This unlocking function remains in effect until such time as the downwardly directed force upon actuator member 182 is removed and the latter is moved upwardly to its original position due to force stored in previously compressed compression spring 196. Once returned to its original position, actuator member 182, through member 192 and detents 194, causes the slight upward movement of force applying member 166 such that is friction pad 178 is in frictional engagement with pad 180, and force applying member 166 is again locked.

Figure 7:
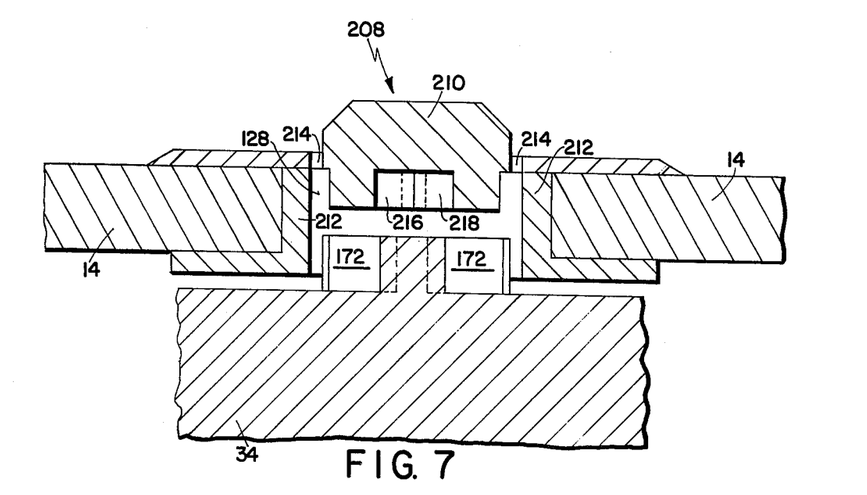
FIG. 7 is a partial sectional view of a third embodiment according to the present invention.

Looking to FIG. 7, there is shown a third embodiment of an adapter apparatus according to the present invention. An adapter apparatus 208 is provided which, unlike both the first and second embodiments, is not operative to automatically arrest or lock the rotation of roller 34 when the adapter is attached to the cassette. Specifically, the adapter apparatus 208 is operative to lock the roller 34 only in response to an externally applied force which is directed at adapter 208. The adapter generally includes a force applying element 210, a support structure 212 for releasably attaching the adapter to the cassette, and a flexible connecting element 214 which bridges the force applying element 210 with the support structure 212.

The force applying element 210, is in its most simple form, a button having three radially extending arms in a "Y" shaped configuration of roller 34. Two of such radially extending arms are depicted at 216 and 218. The overall shape of all three of the arms may be best imagined by looking at the spoked configuration of the top of roller 34 as seen in FIG. 3. The support structure 212 is ideally formed as a gromet-type structure formed of a material which is resilient, such that structure 212 may be easily secured to the side wall 14. Alternatively, the support structure could increase screw-type threads (not shown) and be screwed into the aperture 128 for releasably attaching the adapter to the cassette 10. It should become apparent in this regard that any suitable attaching system may be employed.

The flexible connecting element 214, located between the support structure 212 and the force applying elelent 210, serves to permit movement of element 210 into and out of the aperture 128 in response to an externally applied force to element 210. The force applying element is configured to be movable between a first position as shown in FIG. 7, in which it is out of engagement with the slotted arrangement of roller 34, and a second position in which it is located inwardly of its first position and engages the slotted arrangement 132 for arresting the rotation of roller 34. The flexible connecting element 214 is ideally formed of a material which provides for movement of the force applying element 210 between its first and second positions and yet does not yield to the torsional forces imposed upon it when the force applying element 210 is moved into engagement with the slotted arrangement 132 and the rotation of roller 34 is arrested.

The externally directed forces for actuating both the second and third embodiments previously described may be derived from one of several sources. These may include automatic actuation by specifically directed mechanisms incorporated within the camera and projector units or they may be manually actuated in the proper chronological sequence by the camera and projector operator. Additionally, the adapter may have to be completely removed from the cassette in order to provide for free roller rotation as evidenced by the adapter apparatus denoted as the first embodiment of the present invention. The proper sequencing of locking and unlocking of roller 34 by the adapter apparatus of the present invention can be best realized by relating it to the function or functions which the roller 34 plays in the cassette. To enable a better understanding of roller 34 and its specific functioning, complete knowledge of the cassette and its overall operation will be undertaken.

The film handling cassette 10 is inserted into the camera and the projector for exposure and projection, respectively. Both the exposure and projection of the film strip involve a forward movement of the film strip 26 from the supply reel 28 around the rollers 30, 32, and 34 to the take-up reel 36. The movement of film strip 26 in the forward direction is accomplished through the forward driving force of the drive pawl 29 upon the film strip 26. The drive pawl 29, included within both the camera (not shown) and the projector (not shown) engages the film strip 26 through its sprocket holes 54 and moves the film one frame at a time past opening 40 and prism 42, which make up the exposure and projection station of the cassette. The sprocket holes 54 are separated from each other a distance equal to the length of one picture frame, i.e., 0.166 inch. Accordingly, the film strip 26 is stripped off supply reel 28 and is pulled past the exposure station by drive pawl 29 at increments of 0.166 inch. This rate of movement must be kept constant through the complete exposure and projection of the film strip in order to prevent a blurring of the image imposed upon the film strip during exposure, or subsequently, projected from the film strip.

The film which is drawn past the exposure and projection station by the drive pawl 29 is in turn pushed toward the roller 34. The total "run" between the exposure and projection station to roller 34 is less than 1½ inches; a distance which, when weighed with the physical integrity of film strip 26, is small enough to minimize the probabilities of causing any buckling of the film strip between the station and the roller. As a result, the excess film, i.e., 0.166 inch, is pushed toward the roller 34 and, due to the change in direction of the film about the roller, forms a "free" loop about roller 34. Contact between film strip 26 and roller 34 is present during loop at an area proximate the tangent to roller 34 formed by the "run" between the exposure station and the roller itself. As previously noted, take-up reel 36 is driven by a slip clutch drive arrangement (not shown) which is operative to wind film about the reel when there is a slack in the film proximate the film reel. The film within the "free" loop is wound upon the take-up reel 36 through its driven slip clutch arrangement. The take-up reel 36, however, has a given mass and therefore has a given rotational inertia during and after the winding of the 0.166 inch of film contained within the free loop upon the reel 36 before another 0.166 inch of film is pushed toward roller 34. It is this point of time, between successive pawl drives and subsequent to the winding of the excess film within the free loop upon the take-up reel 36 that the locking of roller 34 is most important. As noted above, it is only during those times of forward movement of the film strip by the pawl drive that exposure of the film and projection of the film takes place. Consequently, the segment of the film strip 26 which is being exposed or is being projected within the exposure and projected station must be isolated from any film movement elsewhere in the cassette which would tend to even slightly displace that segment of film strip during its exposure or projection. It is mandatory that such isolation be accomplished in order to prevent undesirable blurring of the image on the film during exposure, or blurring of the image on the viewing screen during projection. Neither event can be tolerated in a motion-picture film exposure and projection system.

The selective locking of roller 34 by the adapter apparatus of the present invention provides a snubbing action to the film strip 26 intermediate the exposure-projection station and the take-up reel 36 for isolating movement of the latter from the former. Specifically, the drive pawl 29 is operative to push a single frame's worth of film, i.e., 0.166 inch, toward roller 34 which forms a free loop proximate the roller. The slip-clutch drive arrangement for take-up reel 36 is automatically activated when it "senses" this amount of free film and drives reel 36 in the direction shown in FIG. 1 to take-up the 0.166 inch of film contained within the loop. As noted before, take-up reel 36 has a given mass such that when it is rotated, it has rotational inertia. This inertia tends to keep reel 36 rotating even after the slip-clutch drive arrangement has ceased to rotate the reel and all of the film within the free loop is taken up. The roller 34 is locked by the adapter apparatus of the invention for prevented the inertial drag of reel 36 from drawing any more film that the 0.166 inch toward the roller. The frictional engagement between the "locked" rubber insert 122 of roller 34 and film strip 26 at the tangent point discussed above presents a relatively large static retaining force which prevents any slippage of film about roller 34 from the exposure and projection station toward the reel 36. It is this retardation of the further movement of film strip 26 about roller 34 which will be referred to as snubbing, i.e., that the "shock" from reel 36 along film strip 26 is stopped or absorbed at the roller 34. In this regard, it should be again noted that the material used in rubber insert 122 for roller 34 is expressly chosen for its high frictional coefficient when contacted by a strip of film like film strip 26.

The correct operation of the roller 34 for providing a snubbing action to film strip 26 depends, in part, upon a certain degree of film tension between the roller 34 and the exposure and projection station proximate prism element 42. This "back" tensioning is accomplished by a pair of pressure guides (not shown) which engage the opposite edges of the film strip 26 through the aperture 40 and apply a selective retarding force to the film strip between roller 34 and aperture 40. As a consequence, the film strip is in a tensioned state between roller 34 and the film gate thereby insuring the proper frictional engagement between the film strip 26 and the rubber insert 122 of roller 34 at the point of tangency.

The totality of adapters disclosed in the preceding recitation all function to arrest the rotation of the snubbing roller 34 when the film strip 26 is moved in either direction unless removed or selectively actuated. The snubbing action provided to the film strip is ideally employed only during the forward movement of the film strip, i.e., during exposure and projection and not during rewind of the film strip. Accordingly, it is advantageous to either remove the adapter, as explained in relation to the first embodiment, or selectively actuate or deactuate the adapter as explained in relation to the second and third embodiments, respectively. In any case, the roller 34 should be freely rotatable during all rewind operations in order to facilitate movement of the film strip back to the supply reel 28 after exposure for processing purposes or after projection in order to place the film in a condition wherein it is ready for projection once again.

It will be seen that by this invention there is provided an adapter apparatus for a photographic film handling cassette which efficiently causes or imparts a snubbing action to a strip of photographic film contained within the cassette; and includes a snubber roller locking member for effectively locked the snubber roller from free rotation for providing a shock absorbing action between an inertial drag element on one side of the roller and an exposure and projection station on the other side of the roller.

The invention may be practiced or embodied in still other ways without departing from the spirit or essential character thereof. The preferred embodiments described herein are therefore illustrative and not restrictive, the scope of the invention being indicated by the appended claims and all variations which come within the meaning of the claims are intended to be embraced therein.

What is claimed is:

1. An adapter for attachment to a photographic film cassette prior to the cassette being inserted into a camera or projector, the cassette including a housing, means for defining an exposure or projection station, an elongated film strip, means responsive to externally mounted actuating means for facilitating the progressive advancement of the film strip across the exposure or projection station, and means responsive to an external force applying member for imparting a snubbing action to the film strip at a predetermined location within the cassette housing as the film strip is progressively advanced across the exposure or projection station, the snubbing action imparting means normally being in an initial condition wherein it is inoperative to impart the snubbing action to the film strip and arranged and structured to be rendered operative to impart the snubbing action to the film strip when the external force applying member is operably associated therewith, said adapter comprising:

a force applying member; and
means engageable with the cassette and operably associated with said force applying member for releasably attaching said force applying member to the cassette housing in a predetermined orientation in which said force applying member automatically renders the caassette's snubbing action imparting means operative prior to inserting the cassette into the camera or projector.

2. The adapter of claim 1 in which the cassette housing includes means for defining an aperture proximate the means for imparting the snubbing action to the film strip, said force applying member of said adapter being operative to engage the snubber action imparting means through the aperture.

3. The adapter of claim 1 in which the cassette housing includes means for defining an aperture proximate the snubbing action imparting means, the snubbing action imparting means being configured as a snubbing roller mounted within the cassette housing for free rotation about a given axis when it is in its initial condition, said force applying member of said adapter being configured to engage a portion of the snubbing roller through the aperture and prevent the free rotation of the snubbing roller for imparting the snubbing action to the film strip.

4. The adapter of claim 3 in which said means for releasably attaching said force applying member to the cassette housing includes means for statically retaining said adapter upon said cassette when said force applying member is in engagement with said portion of said snubbing roller for preventing the rotation of the same.

5. The adapter of claim 1 in which the cassette housing includes means for defining an aperture proximate the snubbing action imparting means, the snubbing action imparting means being configured as a snubbing roller mounted within the cassette housing for free rotation about a given axis when it is in its initial condition, said force applying member being configured to engage a portion of the snubbing roller through the aperture, said force applying member and the portion of the snubbing roller adapted to engage the force applying member being complementarily configured so as to effect an engagement therebetween for preventing the rotation of the snubbing roller when said adapter is attached to the cassette housing.

6. The adapter of claim 5 in which the portion of the snubbing roller engaged by said force applying member is configured as a slotted arrangement, said force applying member being configured as a complementarily shaped tab which is configured to fit within the slotted arrangement for preventing the free rotation of the snubbing roller thereby imparting the snubbing action to the film strip.

7. The adapter of claim 6 in which said means for releasably attaching said force applying member to the cassette housing includes means for statically retaining said adapter upon said cassette when said tab is fit within the slotted arrangement of the snubber roller for preventing the rotation of the snubber roller.

8. The adapter of claim 1 in which the cassette housing includes means for defining an aperture located proximate the means for imparting the snubbing action to the film strip, said force applying member being operative to engage the snubber action imparting means through the means for defining the aperture whereby the snubbing action is imparted to the film strip, said means for releasably attaching said force applying member to the cassette housing including means for biasing said force applying member into engagement with the snubber action imparting means when said adapter is attached to the cassette housing.

9. The adapter of claim 1 further including means responsive to external stimuli for converting the snubber action imparting means from its operative condition to its inoperative condition.

10. The adapter of claim 1 in which said adapter includes means responsive to external stimuli for converting the snubber action imparting means from its operative condition to its inoperative condition, said adapter apparatus further including means for including means for biasing said force applying member into a condition in which it is operative to convert the snubber action imparting means into its operative condition.

11. The adapter of claim 10 in which said means responsive to external stimuli is movable between a first position, in which it is operable to position said force applying member to its condition in which the force applying member is operative to convert the snubbing action imparting means to its operative condition, and a second position in which it is operable to position said force applying member into a second condition in which it is operative to convert the snubbing action imparting means to its inoperative condition.

12. The adapter of claim 1 in which the cassette housing includes means for defining an aperture proximate the means for imparting the snubbing action to the film strip, said force applying member being operative to engage the snubber action imparting means through the means for defining the aperture, said adapter including means responsive to external stimuli movable between a first position, in which it is operable to position the force applying member into its condition in which the force applying member is operative to convert the snubbing action imparting means to its operative condition, and a second position in which it is operative to position for force applying member into a second condition in which it is operative to convert the snubber action imparting means to its inoperative condition.

13. The adapter of claim 1 in which the cassette housing includes means for defining an aperture proximate the snubbing action imparting means, the snubbing action imparting means being configured as a snubbing roller mounted within the cassette housing for free rotation about a given axis when it is in its initial condition, said force applying member being configured to engage a portion of the snubbing roller through the aperture and prevent the free rotation of the snubbing roller for imparting the snubbing action to the film strip, said adapter including means responsive to external stimuli movable between a first position in which it is operative to position said force applying member in a condition in which it converts the snubbing action imparting means to its operative condition, and a second position in which it is operative to position said force applying member in a second condition in which it converts the snubbing action imparting means to its operative condition.

14. The adapter of claim 13 in which said force applying member is configured being complementarily configured with respect to the portion of the snubbing roller, said force applying member being rotatable with the snubbing roller when said external stimuli responsive means is in its second position and being nonrotatable with respect to the snubbing roller when said external snubbing roller means is in its first position for preventing the free rotation of the snubbing roller for imparting the snubbing action to the film strip.

15. The adapter of claim 14 in which said adapter further includes a first engagement means positioned on a select portion of said force applying member and a second engagement means positioned on a select portion of said releasably attaching means, said first engagement means being movable into and out of engagement with said second engagement means in response to movement of said external stimuli responsive means between said first and second positions, said first engagement means being in engagement with said second engagement means for preventing rotation of said force applying member when said external stimuli responsive means is in its first position and being out of engagement with said second engagement means for permitting rotation of said force applying member with the snubbing roller when external stimuli responsive means is in its second position.

16. The adapter of claim 14 in which said adapter further includes means for biasing said first engagement means of said force applying member into engagement with said second engagement means for preventing rotation of said force applying member and said snubbing roller.

17. An adapter for attachment to a photographic film cassette prior to the cassette being inserted into a camera or projector, the cassette including a housing, means for defining an exposure or projection station, an elongated film strip, means responsive to externally mounted actuating means for facilitating the progressive advancement of the film strip across the exposure or projection station, and means responsive to a force applying member for imparting a snubbing action to the film strip at a predetermined location within the cassette housing as the film strip is progressively advanced across the exposure or projection station, the snubbing action imparting means being in an initial condition wherein it is inoperative to impart the snubbing action to the film strip and arranged and structured to be rendered operative to impart the snubbing action to the film strip when the force applying member is operably associated therewith, said adapter comprising:

a force applying member; and
means connected to said force applying member and engageable with the cassette housing for releasably attaching said adapter to the cassette housing such that said force applying member is in an operably associable position with the snubbing action imparting means, said force applying member being movable between a position in which it is in force applying relationship with the snubbing action imparting means and anaother position in which it is removed from force applying relationship with the snubbing action imparting means.

18. The adapter of claim 17 in which said means for attaching said adapter to the cassette housing includes means for providing for movement of said force applying member between said one position in which it is in force applying relationship with said snubbing action imparting means and its other position in which it is removed from said force applying relationship with the snubbing action imparting means.

19. The adapter of claim 18 in which said means for providing for movement of said force applying member between said one position and said other position is an elastic member.

20. The adapter of claim 19 in which said elastic member of configured relative to said force applying member and the remainder of said adapter attaching means such that it biases said force applying member into its said other position in which said force applying member is removed from said force applying relationship with the snubbing action imparting means.

21. The adapter of claim 18 in which said means for providing for movement of said force applying member between said one position and said other position if further configured and connected with respect to said force applying member and the remainder of said adapter attaching means such that it biases said force applying member into its said other position.

22. The adapter of claim 17 in which the cassette housing includes means for defining an aperture proximate the snubbing action imparting means, said force applying member being operative to engage the snubbing action imparting means through the aperture when said force applying member is in its force applying relationship position.

23. The adapter of claim 17 in which the cassette housing means for defining an aperture proximate the snubbing action imparting means, the snubbing action imparting means being configured as a snubbing roller mounted within the cassette housing for free rotation about a given axis when it is in its initial condition, said force applying member of said adapter being configured to engage a portion of the snubbing roller through the aperture and prevent the free rotation of the snubbing roller for imparting the snubbing action to the film strip.

24. The adapter of claim 17 in which the cassette housing includes means for defining an aperture proximate the snubbing action imparting means, the snubbing action imparting means being configured as a snubbing roller mounted within the cassette housing for free rotation about a given axis when it is in its initial condition, said force applying member being configured to engage a portion of the snubbing roller through the aperture, said force applying member and the portion of the snubbing roller adapted to engage the force applying member being complementarily configured so as to effect an engagement therebetween for preventing the rotation of the snubbing roller when said force applying member is in its force applying relationship with the snubbing action imparting means.

25. The adapter of claim 24 in which the portion of the snubbing roller engaged by said force applying member is configured as a slotted arrangement, said force applying member being configured as a complementarily shaped tab which is configured to fit within the slotted arrangement when moved to its force applying relationship position for preventing the free rotation of the snubbing roller thereby imparting the snubbing action to the film strip.

26. The adapter of claim 17 in which said adapter includes means selectively actuable in response to external stimuli for moving said force applying member between its force applying position and its other position.

27. The adapter of claim 26 in which said adapter includes means for biasing said force applying member into its other position.

28. The adapter of claim 26 in which said biasing means if formed as an elastic member.

29. The adapter of claim 17 in which the cassette housing includes means for defining an aperture proximate the snubbing action imparting means, the snubbing action imparting means being configured as a snubbing roller mounted within the cassette housing for free rotation about a given axis when it is in its initial condition, said force applying member of said adapter being configured to engage a portion of the snubbing roller through the aperture and prevent the free rotation of the snubbing roller for imparting the snubbing action to the film strip, said adapter including means for biasing said force applying member into its other position, said biasing means and said adapter attaching means being further configured to prevent rotation of said force applying member when it engages the portion of the snubbing roller.

30. An adapter for attachment to a photographic film cassette prior to the cassette being inserted into a camera or projector, the cassette including a housing, means for defining an exposure or projection station, an elongated film strip, means responsive to externally mounted actuating means for facilitating the progressive advancement of the film strip across the exposure or projection station, means adapted to receive an external force applying member for imparting a snubbing action to the film strip at a predetermined location within the cassette housing as the film strip is progressively advanced across the exposure or projection station, the receiving means including means defining a slot for receiving the external force appling member, the cassette housing including means for defining an aperture for permitting the external force applying member to be received by the slot, the snubbing action imparting means normally being in an initial condition wherein it is inoperative to impart the snubbing action to the film strip and arranged and structured to be rendered operative to impart the snubbing action to the film strip when the force applying member is received by the slot, said adapter comprising:
 a force applying member; and
 means connected to said force applying member and engageable with the cassette housing for releasably attaching said force applying member to the cassette housing in a predetermined orientation in which said force applying member automatically renders the cassette's snubbing action imparting means operative.

31. A photographic system comprising:
 a cassette including:
  a housing;
  an elongated strip of film;
  means for defining an exposure or projection station;
  means responsive to externally mounted actuating means for facilitating the progressive advancement of said film strip across said exposure or projection station; and
  means responsive to an external force applying member for imparting a snubbing action to said film strip at a predetermined location within the cassette housing as said film strip is progressively advanced across said exposure or projection station, said snubbing action imparting means normally being in an initial condition wherein it is inoperative to impart the snubbing action to said film strip and arranged and structured to be rendered operative to impart the snubbing action to said film strip when said external force applying member is operably associated therewith; and
 an adapter for attachment to said cassette prior to the cassette being inserted into a camera or projector including:
  a force applying member, and
  means connected to said force applying member and engageable with said cassette for releasably attaching said force applying member to said cassette housing in a predetermined orientation in which said force applying member automatically renders the cassette's snubbing action imparting means operative.

32. An adapter for a photographic film handling cassette, the cassette including a housing, including means defining an aperture therein, means for defining an exposure or projection station, an elongated film strip, means responsive to externally mounted actuating means for facilitating the progressive advancement of the film strip across the exposure or projection station, a snubbing roller rotatably mounted with the housing, the snubbing roller being responsive to an external force applying member applied to the snubbing roller through the aperture for imparting a snubbing action to the film strip at a predetermined location within the cassette housing as the film strip is progressively advanced across the exposure or projection station, the snubbing roller normally being in an initial condition wherein it is inoperative to impart the snubbing action to the film strip and arranged and structured to be rendered operative to impart the snubbing action to the film strip when the external force applying member operably engages the snubbing roller, said adapter comprising:

a force applying member; and
means connected tto said force applying member for releasably attaching said adapter to the cassette housing such that said force applying member is oriented in operable association with the snubbing roller through the aperture formed in the cassette housing, said attaching means being configured as a u-shaped bracket adapted to clip on to the cassette housing such that the two oppositely oriented portions of said u-shaped bracket engage oppositely oriented sides of the cassette housing, said force applying member being formed on an inner portion of one of said oppositely oriented portions so as to be operably directed toward the cassette when said adapter is attached thereto, said two oppositely oriented portions of said u-shaped bracket being spaced from each other a distance less than the spacing distance between the oppositely oriented sides of the cassette housing with which they are in engagement such that said two oppositely oriented portions of said u-shaped bracket are biased toward each other when said adapter is attached to the cassette for providing a force for retaining said adapter on said cassette and for biasing said force applying member into operable association with the snubbing roller, the cassette housing including means defining a cutaway portion therein with which a portion of said u-shaped bracket is engageable for preventing movement of said adapter relative to the cassette when the adapter is attached thereto.

* * * * *